United States Patent
Barnes et al.

(10) Patent No.: US 9,222,375 B2
(45) Date of Patent: Dec. 29, 2015

(54) VARIABLE VALVE ACTUATION APPARATUS, SYSTEM, AND METHOD

(71) Applicant: Cummins Inc., Columbus, IN (US)

(72) Inventors: David M. Barnes, Columbus, IN (US); Adam C. Cecil, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/162,161

(22) Filed: Jan. 23, 2014

(65) Prior Publication Data

US 2014/0190433 A1    Jul. 10, 2014

Related U.S. Application Data

(63) Continuation of application No. 13/341,970, filed on Dec. 31, 2011, now Pat. No. 8,667,939, which is a continuation of application No. PCT/US2010/024414, filed on Feb. 17, 2010.

(60) Provisional application No. 61/207,780, filed on Feb. 17, 2009.

(51) Int. Cl.
| | |
|---|---|
| *F01L 1/34* | (2006.01) |
| *F01L 1/047* | (2006.01) |

(Continued)

(52) U.S. Cl.
CPC .................. *F01L 1/047* (2013.01); *F01L 1/053* (2013.01); *F01L 1/18* (2013.01); *F01L 1/26* (2013.01); *F01L 1/267* (2013.01); *F01L 1/34* (2013.01); *F01L 13/0021* (2013.01);
(Continued)

(58) Field of Classification Search
CPC ............... F01L 1/047; F01L 1/18; F01L 1/26; F01L 1/34; F01L 2001/0473

USPC ......................... 123/90.39, 90.44, 90.16, 90.6
See application file for complete search history.

(56) References Cited

U.S. PATENT DOCUMENTS

| | | |
|---|---|---|
| 5,671,706 A | 9/1997 | Frost et al. |
| 6,182,362 B1 | 2/2001 | Lancefield |

(Continued)

FOREIGN PATENT DOCUMENTS

| | | |
|---|---|---|
| GB | 2438628 | 12/2007 |
| JP | 56107906 | 8/1981 |

(Continued)

OTHER PUBLICATIONS

International Search Report and Written Opinion, ISAKR, PCT2010/024414, Cummins Inc., Aug. 18, 2010.

*Primary Examiner* — Ching Chang
(74) *Attorney, Agent, or Firm* — Taft Stettinius & Hollister LLP (57) ABSTRACT

A variable valve actuation system in one form includes a rocker coupled with a valve stem at one end and a cam follower at the other end. The rocker is operable to rotate about a fixed axis and the cam follower includes a set of lower rollers operable to follow one cam lobe and an upper roller operable to follow another cam lobe. A leaf spring can be used to couple the cam follower with the rocker. A cam shaft can have a nested configuration that includes an inner shaft, an intermediate tube, and an outer tube. Cam lobes can be fastened to the cam shaft by fastening through each of the inner shaft, intermediate tube, and outer tube. The cam lobes can be attached by at least two devices inserted from either side of the cam shaft and that are not inserted at least through the inner shaft.

17 Claims, 13 Drawing Sheets

(51) Int. Cl.
  *F01L 1/053* (2006.01)
  *F01L 1/18* (2006.01)
  *F01L 1/26* (2006.01)
  *F01L 13/00* (2006.01)
  *F01L 1/344* (2006.01)
  *F02D 13/02* (2006.01)
  *F02M 25/07* (2006.01)

(52) U.S. Cl.
  CPC .... *F01L 13/0026* (2013.01); *F01L 2001/0473* (2013.01); *F01L 2001/34489* (2013.01); *F02D 13/0269* (2013.01); *F02D 2013/0292* (2013.01); *F02M 25/0752* (2013.01); *Y02T 10/142* (2013.01); *Y10T 29/49293* (2015.01)

(56) References Cited

U.S. PATENT DOCUMENTS

| | | | |
|---|---|---|---|
| 6,213,071 B1 | 4/2001 | Lancefield et al. | |
| 6,247,436 B1 | 6/2001 | Lancefield et al. | |
| 6,250,267 B1 | 6/2001 | Methley | |
| 6,253,719 B1 | 7/2001 | Methley | |
| 6,253,720 B1 | 7/2001 | Lancefield et al. | |
| 6,263,845 B1 | 7/2001 | Lancefield et al. | |
| 6,308,669 B1 | 10/2001 | Lancefield et al. | |
| 6,354,255 B1 | 3/2002 | Methley et al. | |
| 6,487,997 B2 | 12/2002 | Palumbo | |
| 6,591,800 B1 | 7/2003 | Methley | |
| 6,725,817 B2 | 4/2004 | Methley et al. | |
| 6,725,818 B2 | 4/2004 | Methley | |
| 6,854,434 B2 | 2/2005 | Methley | |
| 6,941,910 B2 | 9/2005 | Methley | |
| 7,051,688 B2 | 5/2006 | Lancefield | |
| 7,117,831 B2 | 10/2006 | Methley | |
| 7,134,411 B2 | 11/2006 | Lancefield et al. | |
| 7,191,743 B2 * | 3/2007 | Weber et al. | 123/90.11 |
| 7,210,440 B2 | 5/2007 | Lawrence et al. | |
| 7,270,096 B2 | 9/2007 | Lancefield et al. | |
| 7,273,024 B2 | 9/2007 | Lancefield et al. | |
| 7,284,517 B2 | 10/2007 | Lancefield et al. | |
| 7,287,499 B2 | 10/2007 | Lawrence et al. | |
| 7,311,072 B2 | 12/2007 | Hoffmann et al. | |
| 7,318,399 B2 | 1/2008 | Methley | |
| 7,444,968 B2 | 11/2008 | Lancefield et al. | |
| 7,506,624 B2 * | 3/2009 | Deane | 123/90.39 |
| 7,677,213 B2 | 3/2010 | Deierlein | |
| 8,033,261 B1 | 10/2011 | Robbins | |
| 8,113,158 B2 | 2/2012 | Lancefield et al. | |
| 8,667,939 B2 * | 3/2014 | Barnes et al. | 123/90.17 |
| 2007/0199529 A1 * | 8/2007 | Deane | |
| 2008/0184950 A1 | 8/2008 | Lawrence et al. | |
| 2008/0196681 A1 | 8/2008 | Lancefield et al. | |
| 2008/0223321 A1 | 9/2008 | Methley | |
| 2008/0257104 A1 | 10/2008 | Lancefield et al. | |
| 2012/0291733 A1 | 11/2012 | Barnes et al. | |

FOREIGN PATENT DOCUMENTS

| | | |
|---|---|---|
| JP | 59176411 | 10/1984 |
| JP | 2002054410 | 2/2002 |
| KR | 1019950014401 | 11/1995 |
| KR | 1020010061177 | 7/2001 |
| WO | WO 2007138354 A1 * | 12/2007 |

* cited by examiner

VARIABLE VALVE ACTUATION APPARATUS, SYSTEM, AND METHOD

CROSS REFERENCE TO RELATED APPLICATIONS

The present application is a continuation of U.S. patent application Ser. No. 13/341,970 filed on Dec. 31, 2011, which is a continuation of PCT/US2010/024414 filed on Feb. 17, 2010, which claims the benefit of U.S. Provisional Patent Application 61/207,780, filed Feb. 17, 2009, and each of the referenced applications is incorporated herein by reference.

TECHNICAL FIELD

The present invention generally relates to internal combustion engines, and more particularly, but not exclusively, to variable valve actuation systems used in internal combustion engines such as diesel engines.

BACKGROUND

Variable valve actuation (VVA) can improve engine performance by enabling different combustion strategies at different operating conditions, including Miller cycling, internal exhaust gas recirculation (iEGR), thermal management for aftertreatment control, and decompression for engine starting. Both intake and exhaust valves can be variably actuated to enable this combustion strategies, changing the valve's lift and/or duration. Known VVA systems with both intake and exhaust lift and duration flexibility can be grouped into 3 categories: full electric, hydraulic lost motion (partially mechanical), and fully mechanical. One problem with full-functioning, fully mechanical VVA systems is their large physical size. Package space around the valves is classically limited due to height and width constraints and is increasingly limited in advanced engines due to increasing fuel system space claims. Accordingly, there remains a need for further contributions in this area of technology.

SUMMARY

One embodiment of the present invention is a unique variable valve actuation device. Other embodiments include apparatuses, systems, devices, hardware, methods, and combinations for providing variable valve actuation. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one non-limiting embodiment the present application utilizes one double-concentric complex cam (sometimes referred to herein as a "double nested cam") to provide both intake and exhaust variable actuation and packages on only one side of the cylinder head. The double nested cam has one center shaft and two tubes including an intermediate tube and an outer tube. In one form non-variable lobes for both intake and exhaust function are attached to the outer tube. In one form one of the variable lobes is attached to the intermediate tube and the other of the variable lobes is attached to the center shaft. However, the present application further contemplates an embodiment wherein both of the intermediate tube and the outer tube have variable lobes.

Figure 1:
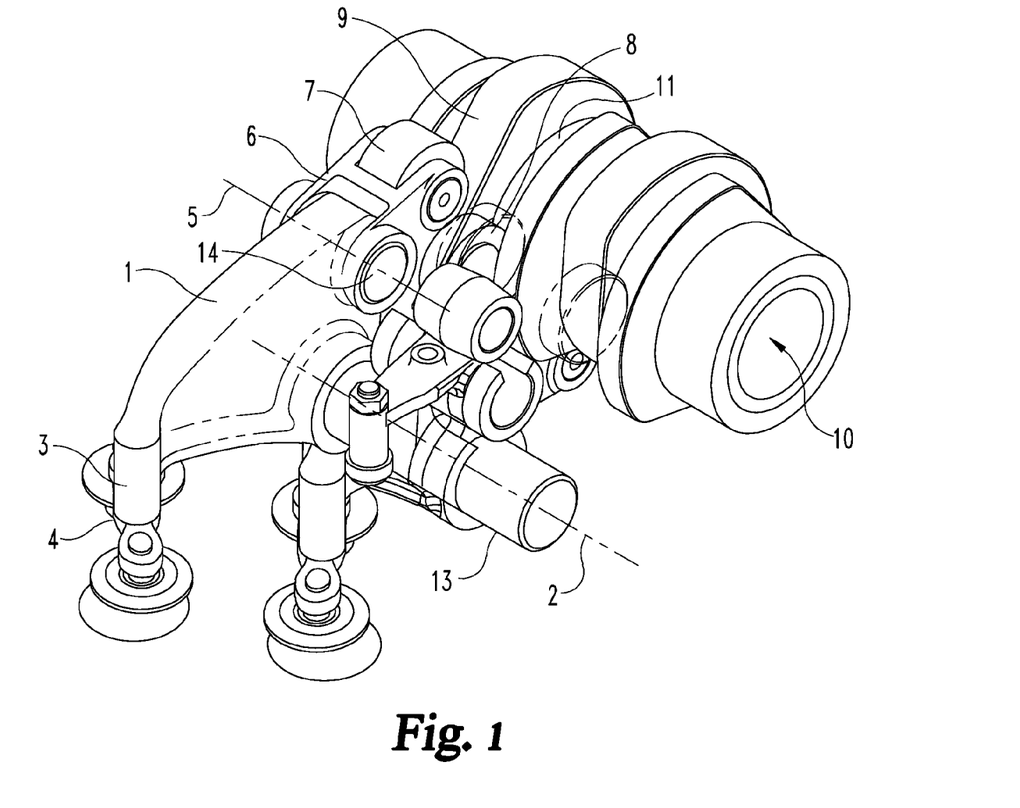
FIG. 1 depicts one form of a cam shaft and rocker assembly.
Figure 2:
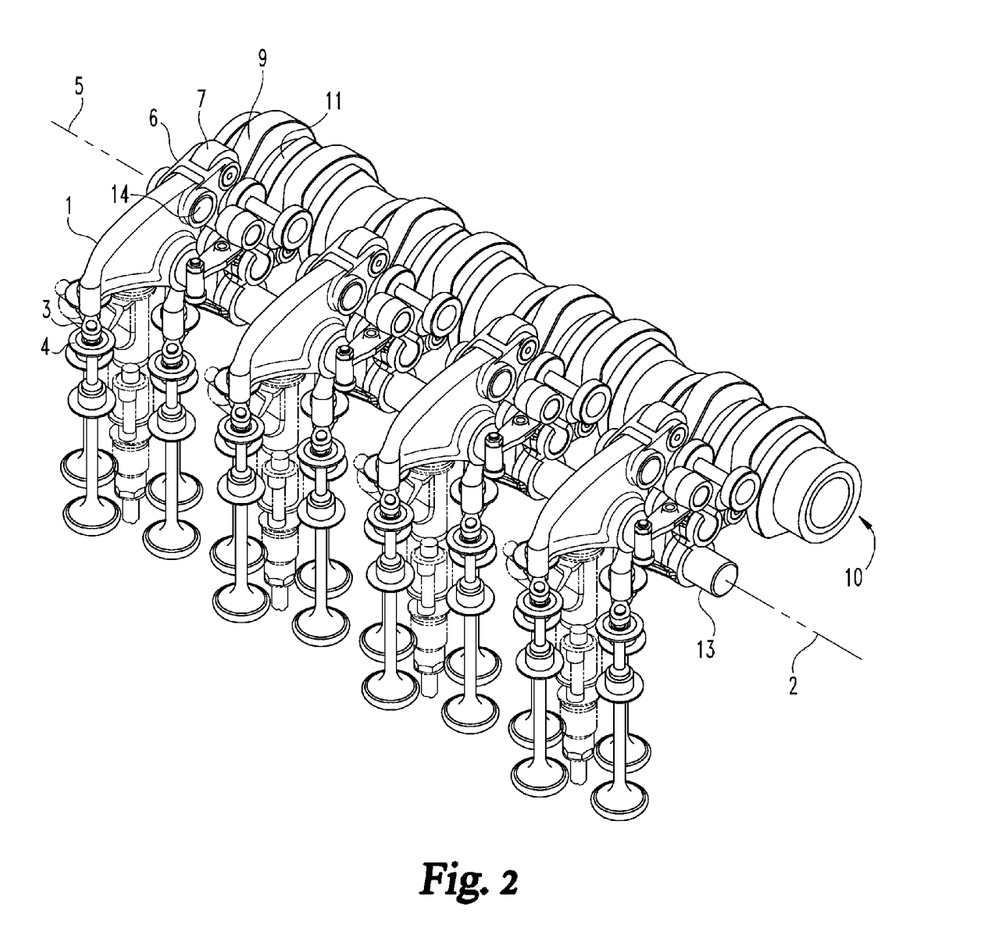
FIG. 2 depicts one form of a cam shaft and rocker assembly.
Figure 3:
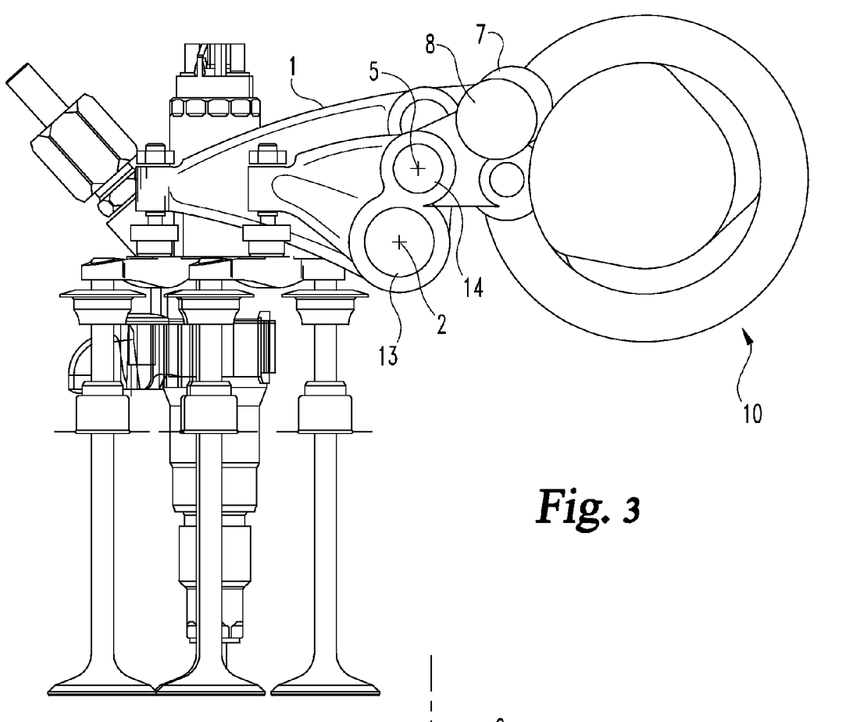
FIG. 3 depicts one form of a cam shaft and rocker assembly.
Figure 4:
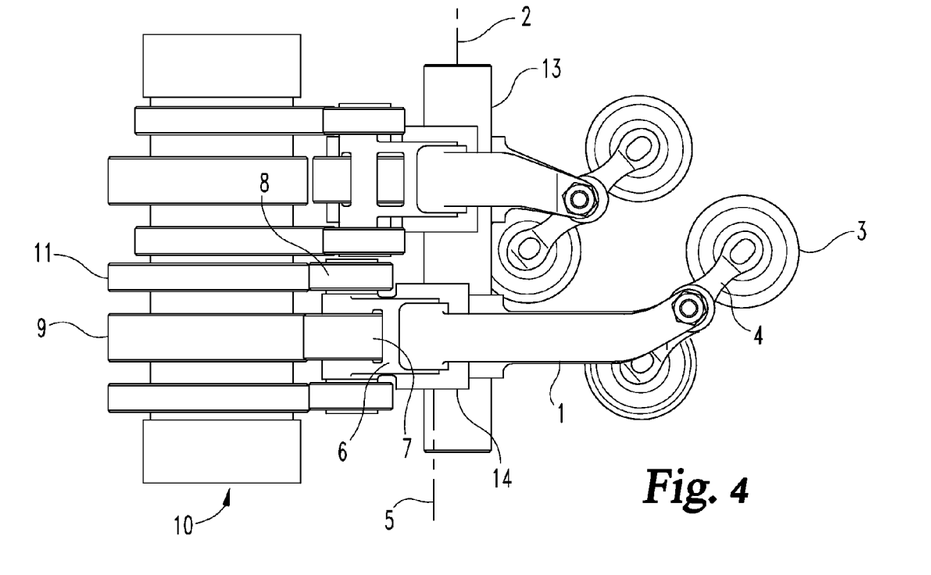
FIG. 4 depicts one form of a cam shaft and rocker assembly.
Figure 5:
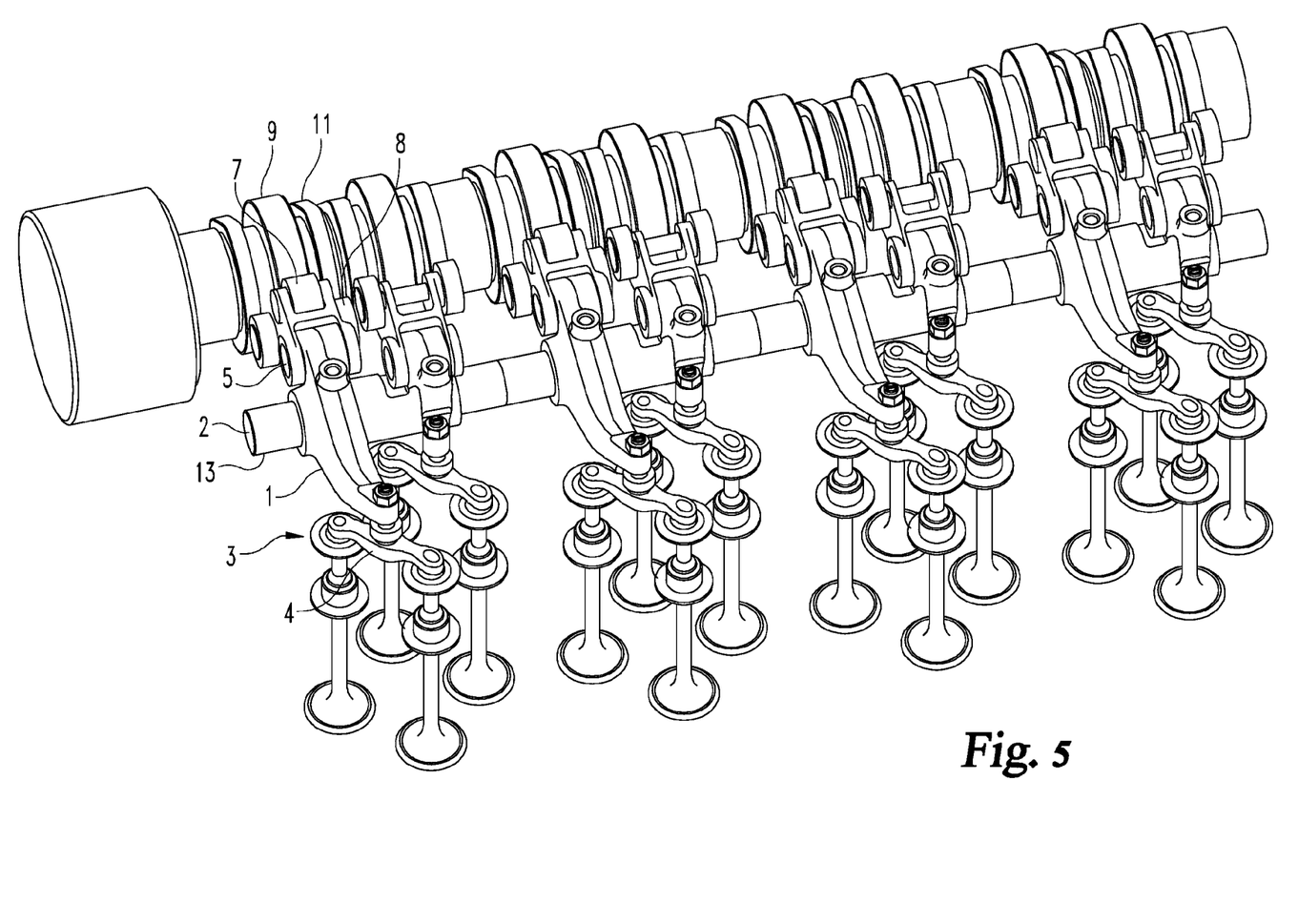
FIGS. 5 and 5a depict one form of a cam shaft and rocker assembly.
Figure 5A:
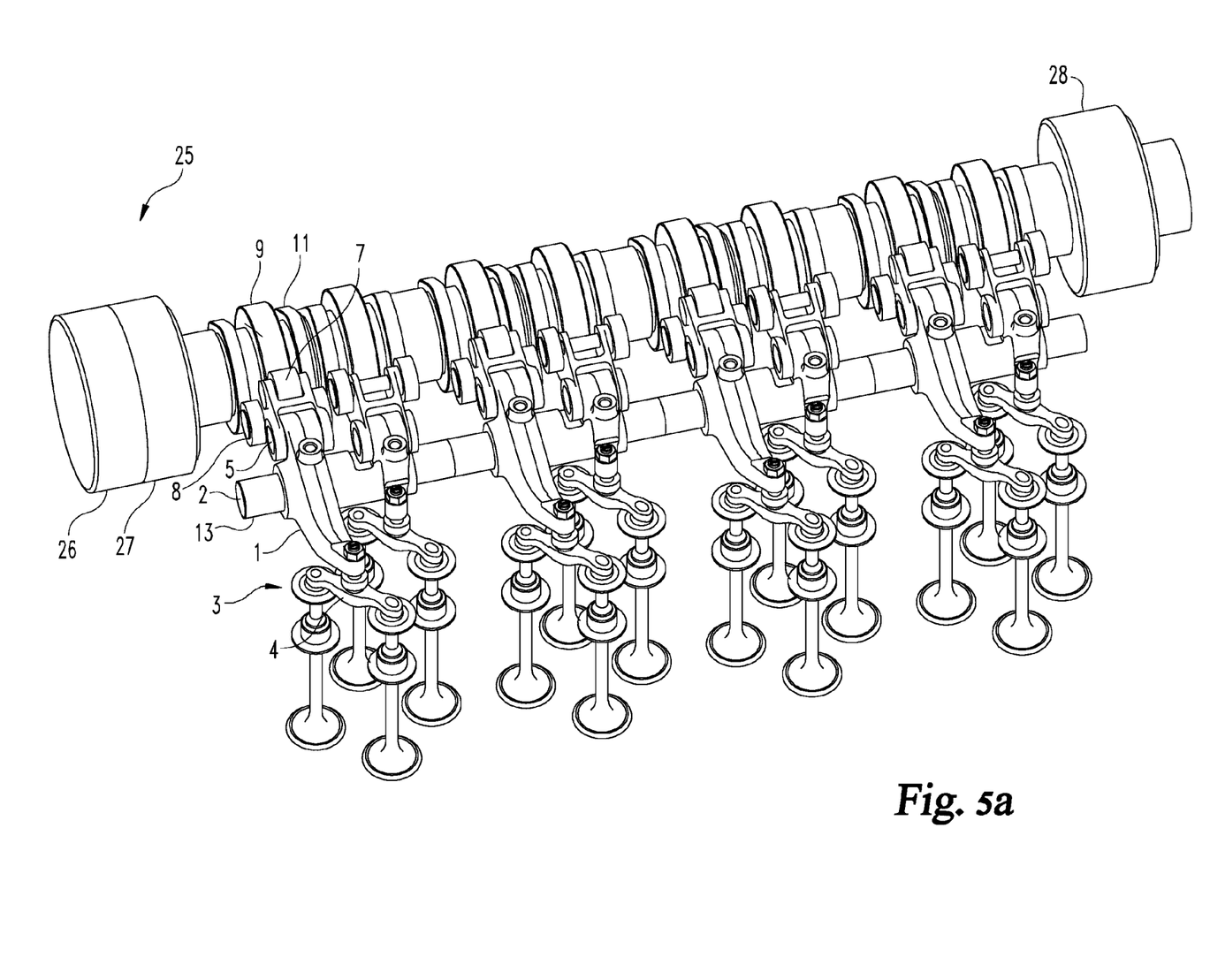
Figure 6:
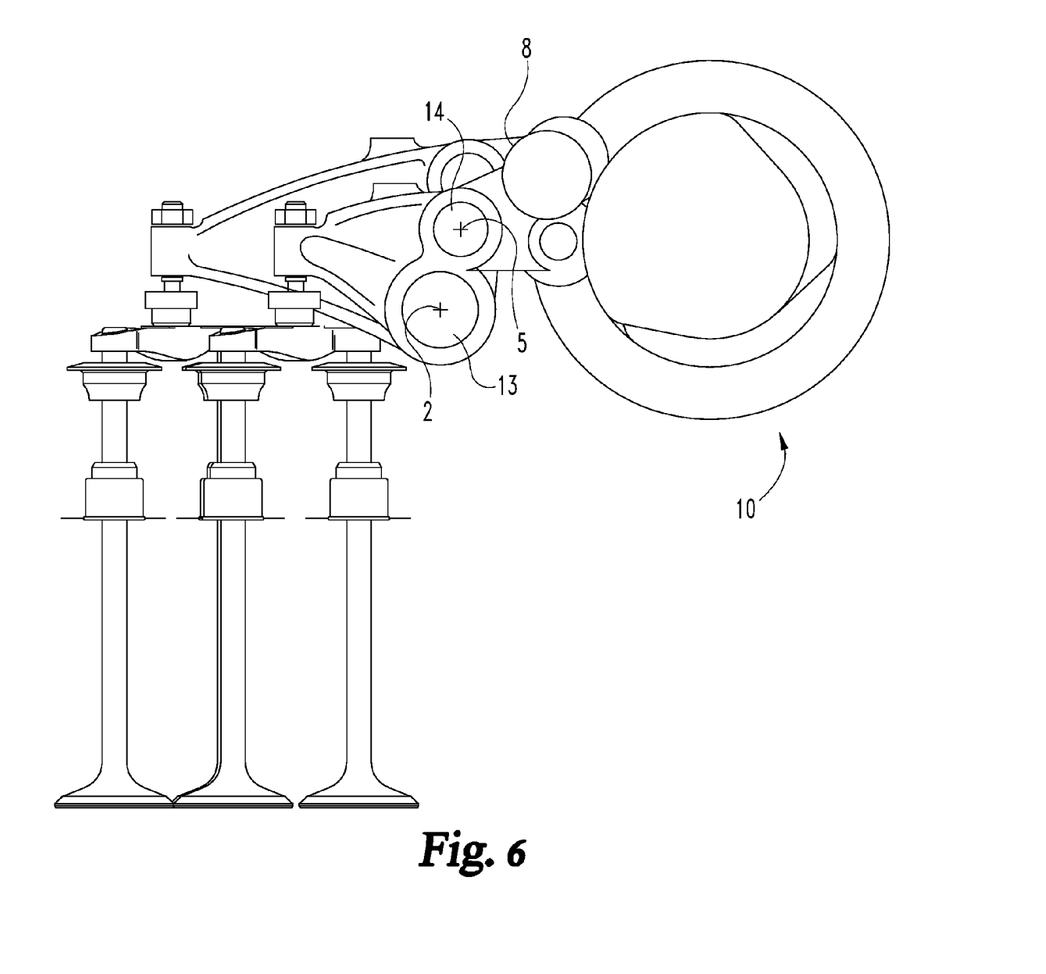
FIG. 6 depicts one form of a cam shaft and rocker assembly.
Figure 7:
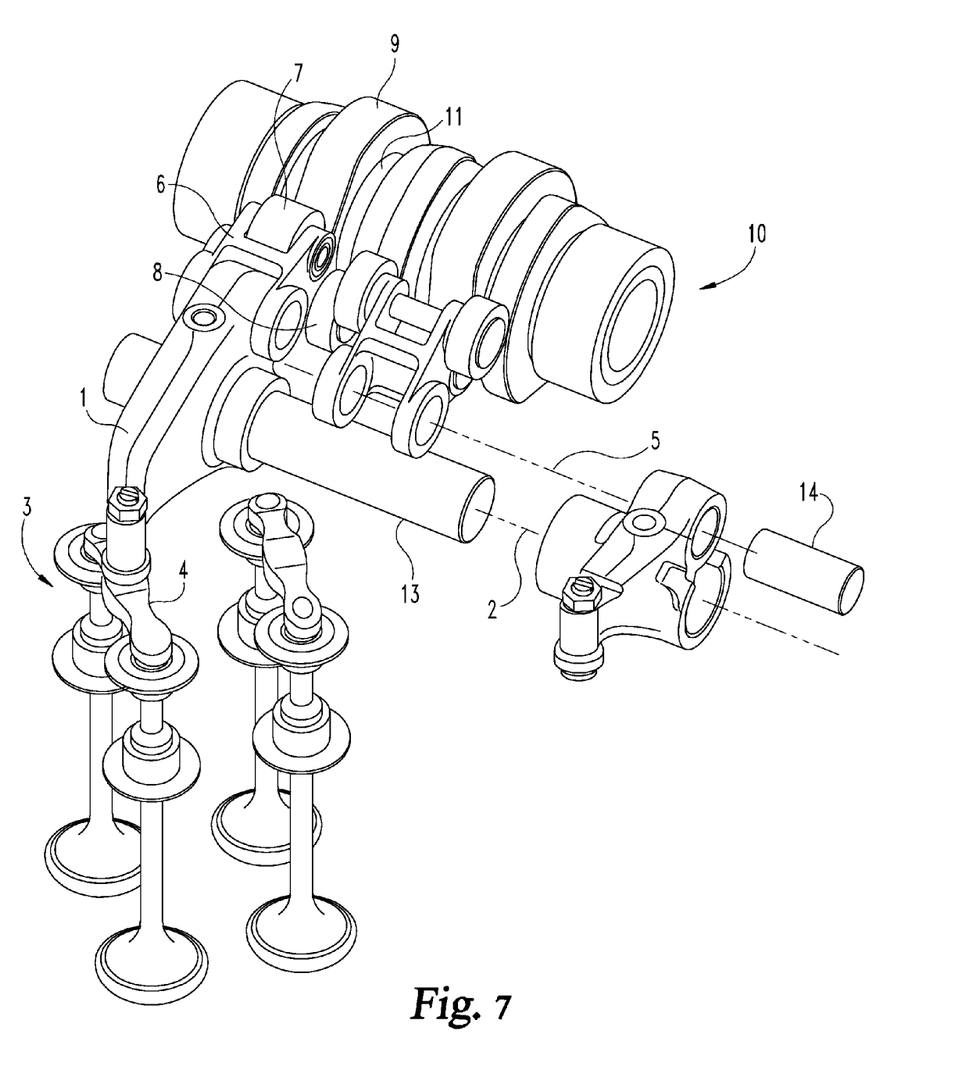
FIG. 7 depicts one form of a cam shaft and rocker assembly.
Figure 8:
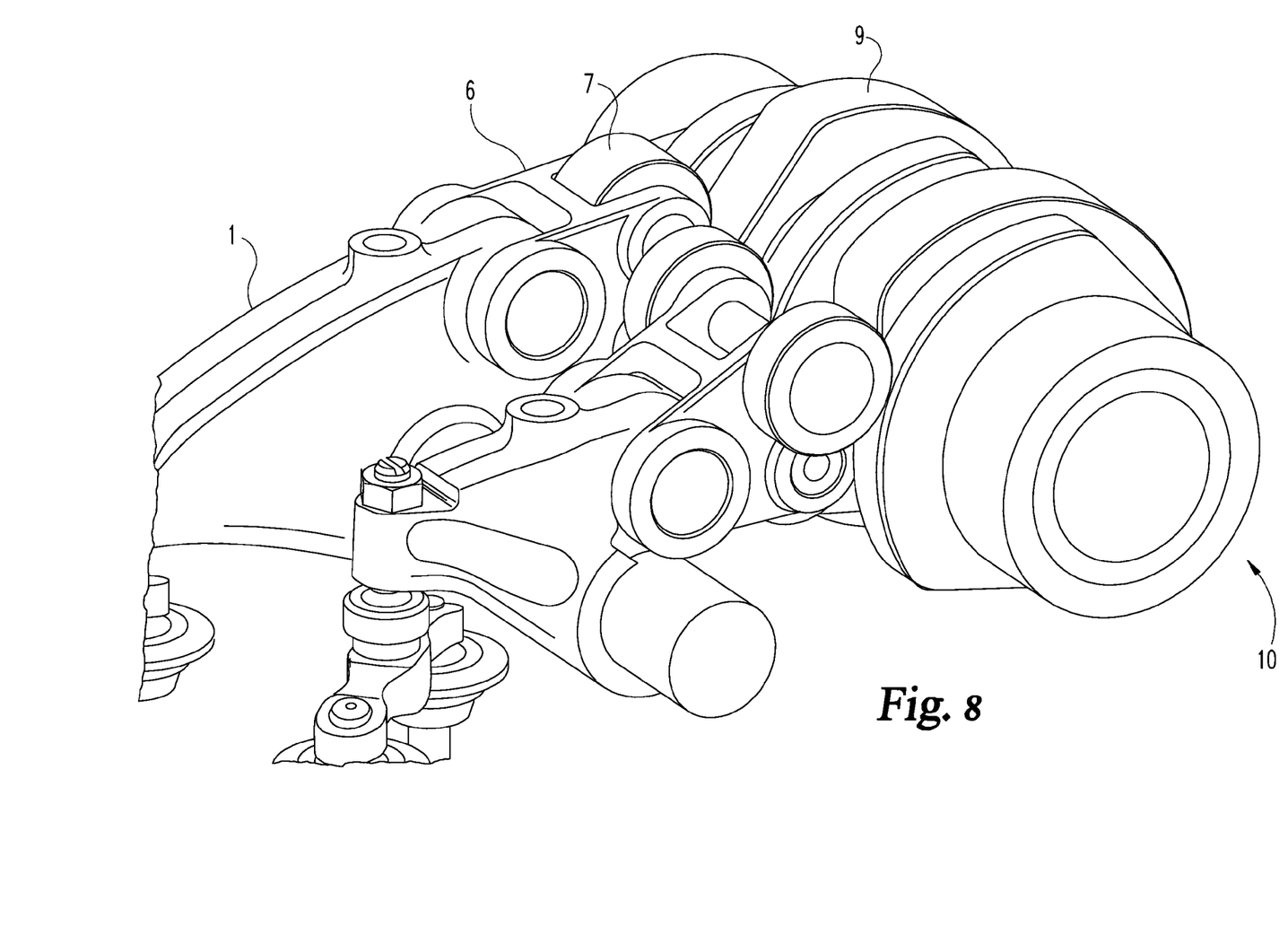
FIG. 8 depicts one form of a cam shaft and rocker assembly.

With reference to FIGS. 1-9, a rocker 1 rotates around a fixed axis 2, moving an adjustable e-foot 3 which actuates traditional overhead poppet valves via a crosshead 4. A follower 6 is pivotally coupled to the rocker 1 about an axis 5. The rocker 1 is rotated about the fixed axis 2 through shaft 13 when it receives a force through its input axis 5, an axis along a pin 14, generated by the movement of the follower 6. The movement of the follower 6 is generated by the geometric constraints of its three axes: its output axis which is coaxial with the first rocker assembly's input axis 5; an axis through an upper roller 7; and an axis through a lower roller 8. The upper roller 7 follows a cam lobe 9 on the cam assembly 10 while the lower roller 8 follows a cam lobe 11 which is also on the cam assembly 10. In one form the lower cam/roller set can be paired with one set on either side of the cam lobe 9 so as to balance the follower 6. The lower cam lobe 11 causes the valve to open while the upper cam lobe 9 allows the valve to close. In an alternative embodiment the lower cam lobe 11 causes the valve to close while the upper cam lobe 9 causes the valve to open. Additional rocker motion is controlled via spring(s) (not illustrated). In one form, the spring(s) influence motion of the follower 6 such that the upper roller 7 disengages from the cam lobe 9 during at least a portion of a revolution of the cam assembly 10. In one form the fixed lobes 11 are attached to the outer tube of the camshaft assembly 10. In one form the cam lobe 9 can be either attached to the intermediate tube (intake) or the inner shaft (exhaust). One embodiment of the cam assembly 10 is discussed further hereinbelow. The inner shaft and inner tube modulation are controlled via a duplex cam phaser (not shown) or two phasers, one on each end of the cam. In other non-limiting embodiments, the modulation can be controlled via a duplex cam phaser 25 disposed toward one end of the cam assembly (having phasers 26 and 27) and another phaser 28 can be disposed toward another end of the cam assembly, as is illustrated in FIG. 5a. Such embodiments may include additional rotating shaft and/or tube, as will be described further in one-nonlimiting form below. In one form the phaser 28 can be disposed on the drive end of the cam assembly.

Figure 9:
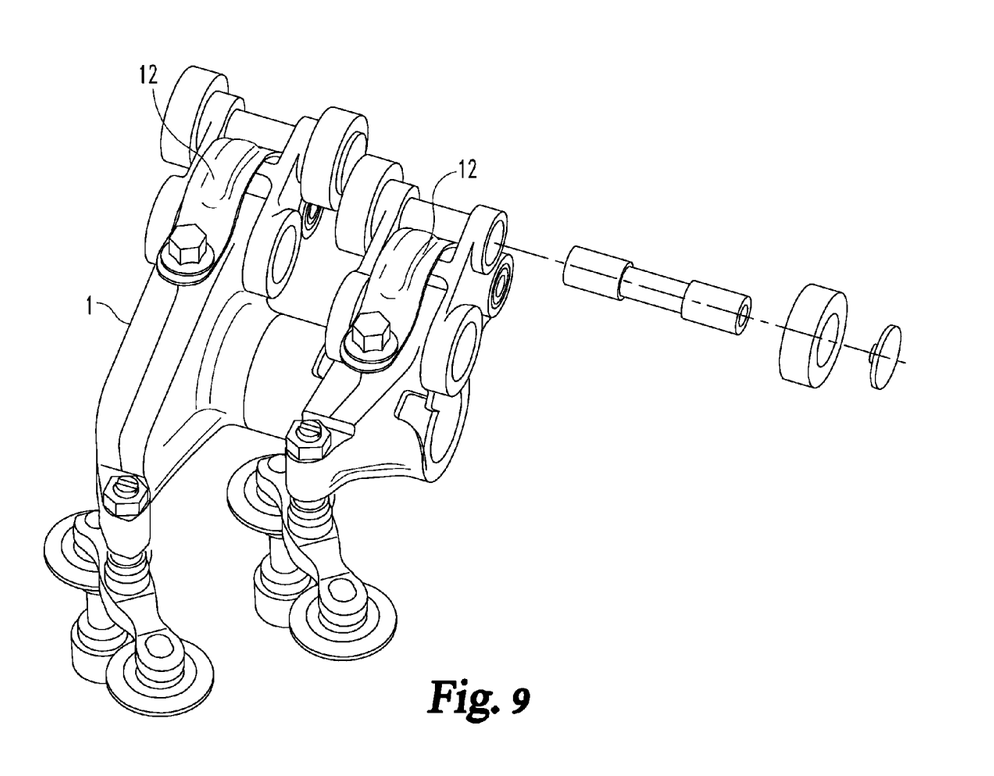
FIG. 9 depicts one form of a rocker assembly.
Figure 10:
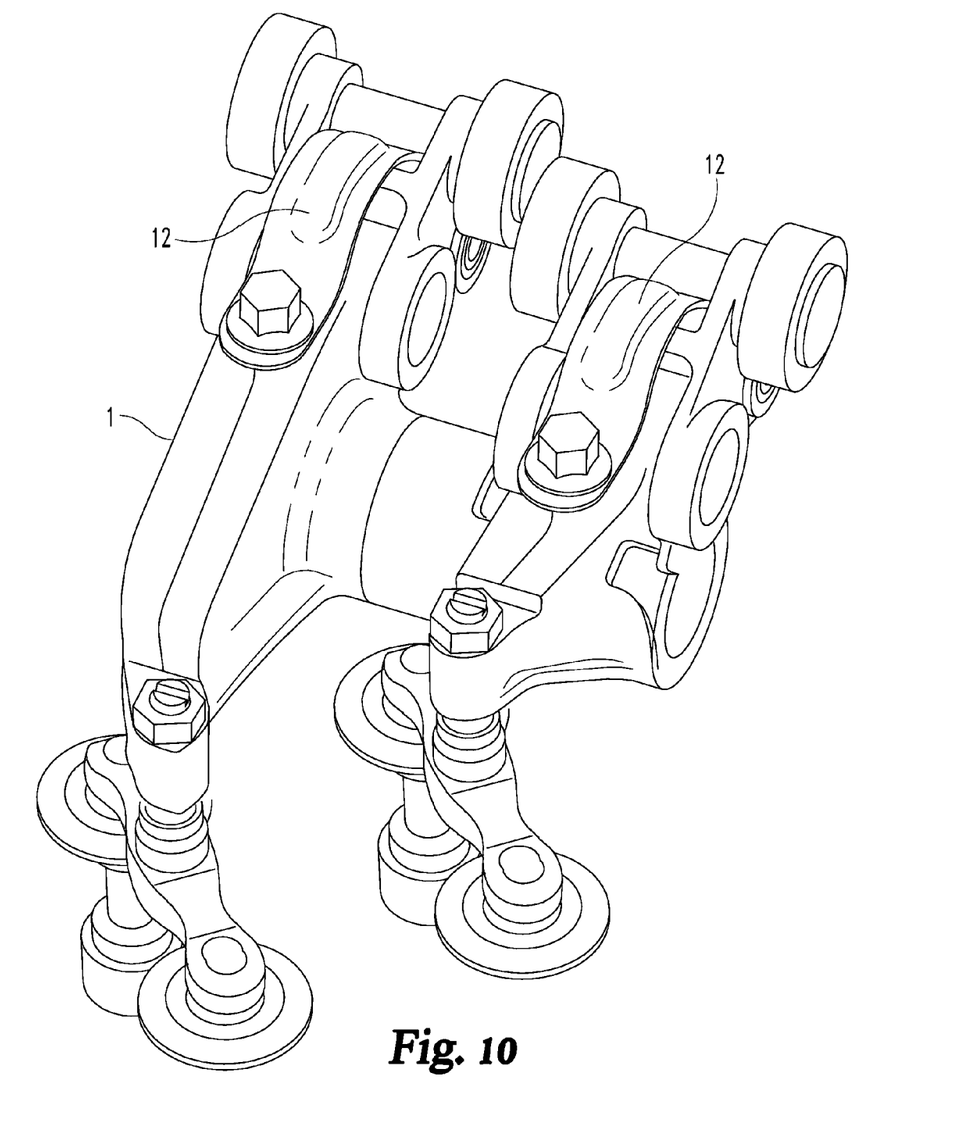
FIG. 10 depicts one form of a rocker assembly.
Figure 11:
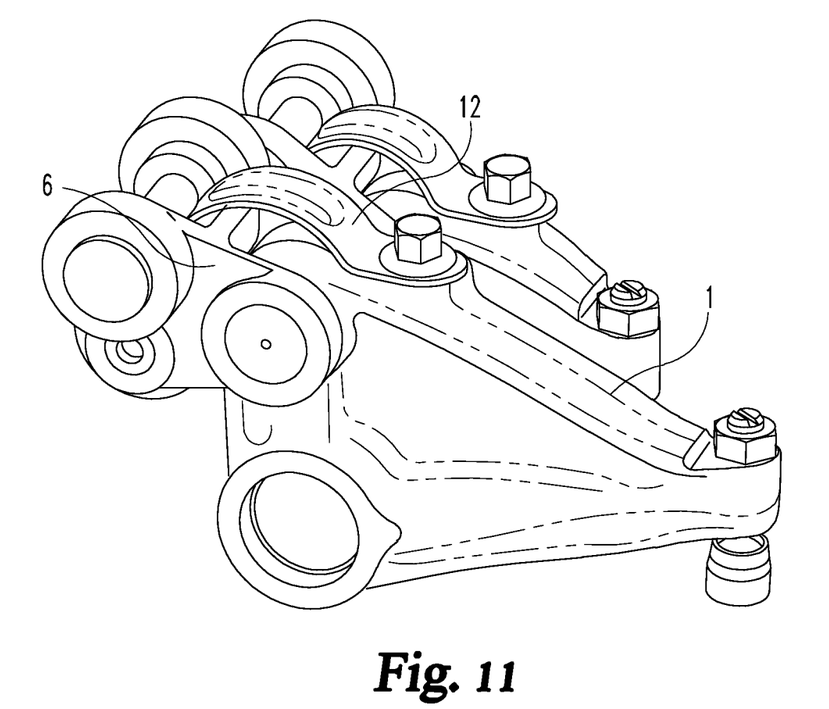
FIG. 11 depicts one form of a rocker assembly.

Turning now to FIGS. 9-11 and with continuing reference to FIGS. 1-8, the follower 6 is shown coupled with the rocker 1 using an energy storage device 12. in one form the energy storage device is a leaf spring. The energy storage device 12 biases the follower 6 into the cam lobe. In the illustrative embodiment the energy storage device 12 is attached at one end to the rocker 1 with a fastener but can be attached using other techniques. At the other end the energy storage device 12 engages the follower 6. The energy storage device 12 can engage the follower 6 in any variety of locations.

Figure 12:
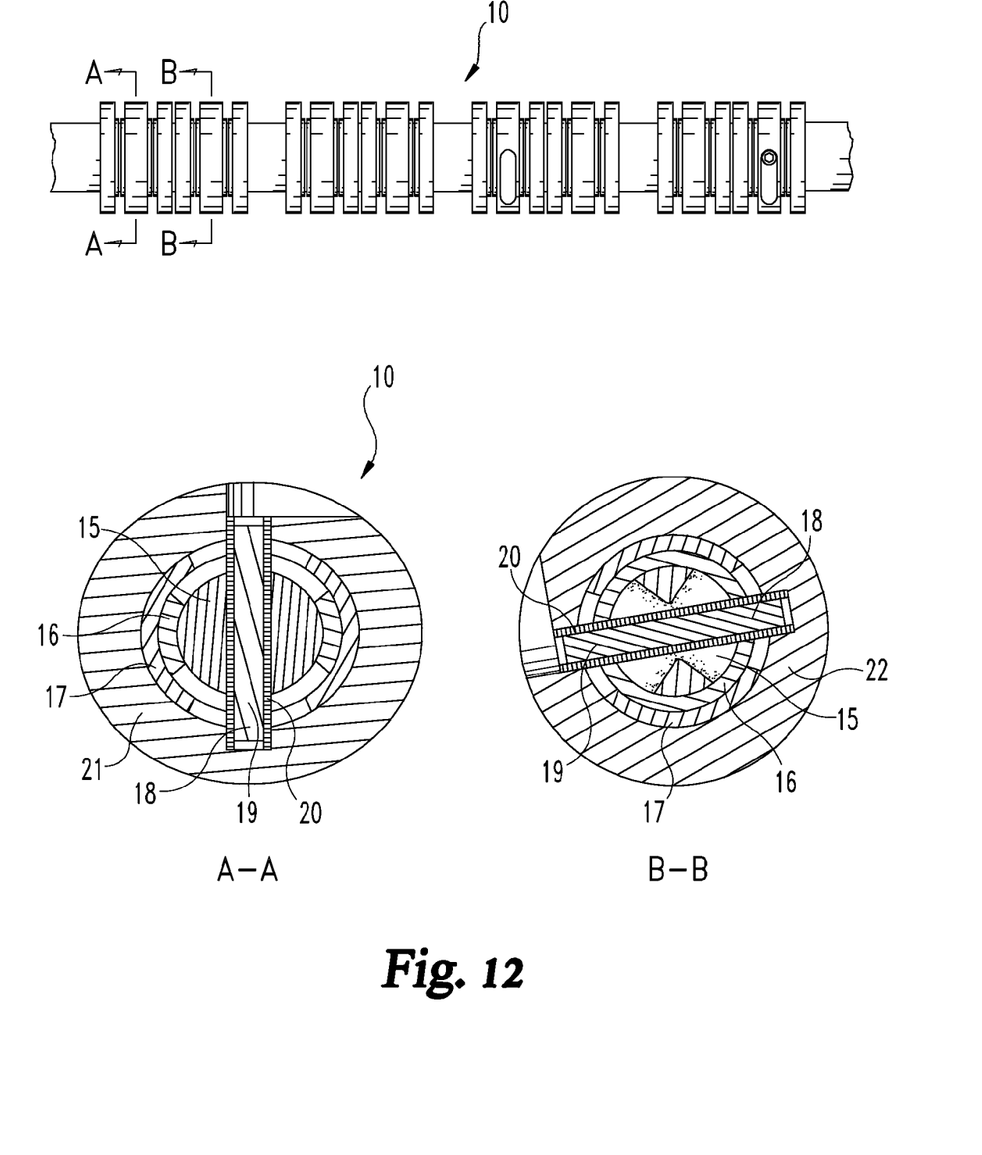
FIG. 12 depicts one form of a cam shaft.
Figure 13:
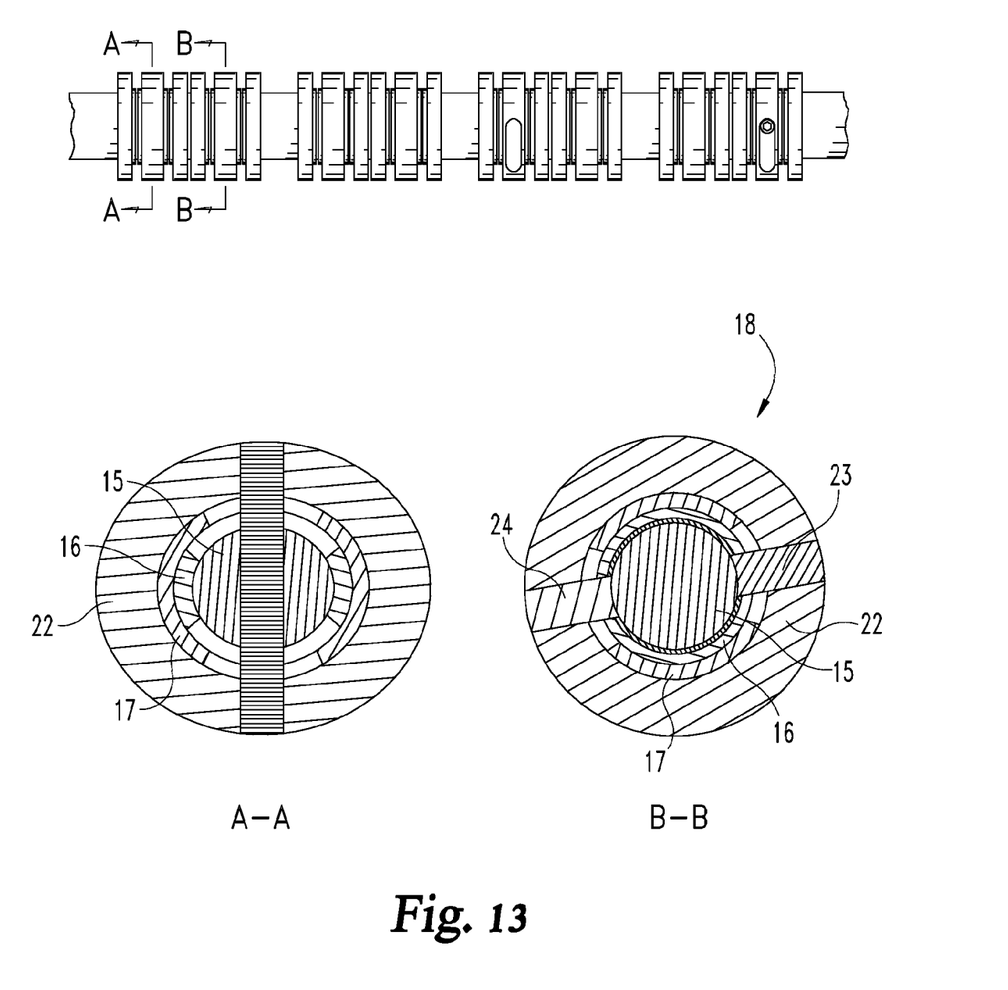
FIG. 13 depicts one form of a cam shaft.

Turning now to FIGS. 12-13, various views are depicted of a cam. The present application is not limited to the following techniques of assembly and can be assembled using other techniques of assembly in addition to those contemplated herein. In the illustrative form the cam assembly 10 includes an inner shaft 15, intermediate tube 16, and outer tube 17, each of which can be capable of being rotated independent of the others. In one embodiment a phaser arrangement such as that depicted in FIG. 5a can be used to manipulate each of the inner shaft 15, intermediate tube 16, and outer tube 17. A cam lobe 21, which can, but need not, represent the intake cam lobe, is coupled to the inner shaft 15 with a pin assembly 18 which can include a pin 19 and a sleeve 20. The pin assembly 18 can use a press fit or an interference fit, among possible other techniques. The cam lobe 21 can be coupled to the intermediate tube 16 and/or outer tube 17 in other embodiments. The intermediate tube 16 and the outer tube 17 include cutouts that allow the intermediate tube 16 and the outer tube 17 to rotate freely of the inner shaft 15. A cam lobe 22, which can represent the exhaust cam lobe, is coupled to the intermediate tube 16 with a pin assembly 18 which can include a pin 19 and sleeve 20. The cam lobe 22 can be coupled to the inner shaft 15 or the outer tube 17 in other embodiments. The pin assembly 18 used to connect the cam lobe 22 to the intermediate tube 16 is allowed to pass through apertures formed in the inner shaft 15 and outer tube 17. A cutout is formed in the inner shaft 15 to permit adequate range of motion for the cam assembly 10. Though the pin assembly 18 can be used to couple both the cam lobe 21 and cam lobe 22 to the inner shaft 15 and intermediate tube 16, respectively, other embodiments may use different assembly techniques to fasten the cam lobe 21 and cam lobe 22.

FIG. 13 depicts another embodiment of the cam assembly 10. The cam lobe 22 is depicted in this embodiment coupled with the intermediate tube 16 with a pin assembly 18 that includes pins 23 and 24. The outer tube 17 includes apertures that permit the pins 23 and 24 to pass. The pins 23 and 24, furthermore, can take the same form or can be different. The pins 23 and 24 in this embodiment are depicted without a sleeve as in the previous embodiment, but it will be appreciated that the particular fastening technique for either embodiment can be different than that depicted.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions which are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a cam shaft having a reference elongate member driven by an engine crank shaft, the cam shaft including a shaft, a first tube, and a second tube, wherein the shaft and first tube are within the second tube and the shaft is within the first tube, wherein the shaft, the first tube and the second tube rotate independently of one another, the camshaft further having a first cam lobe coupled to the shaft with a first pin assembly that passes through the shaft and through cutouts in the first and second tubes, and a second cam lobe coupled to the first tube with a second pin assembly passing through apertures in the second tube wherein the first lobe and the second lobe are structured to be independently clocked relative to the reference elongate member when the cam shaft is in operation.

2. The apparatus of claim 1, wherein the second lobe is coupled to the tube with a first member and a second member, the shaft prohibiting the first member or the second member from passing from one side of the shaft to the other side of the shaft.

3. The apparatus of claim 1, wherein the first cam lobe is coupled to rotate with the shaft and the second cam lobe is coupled to rotate with the first tube.

4. The apparatus of claim 3, wherein the second lobe is coupled to the first tube with the second in assembly, the second pin assembly including a first pin and a second pin, the first pin prohibited from passing through the shaft.

5. The apparatus of claim 1, wherein the first pin assembly includes a pin within a sleeve.

6. A method comprising:
    coupling a double nested camshaft with a crankshaft of an internal combustion engine, the camshaft including a shaft, a first tube, and a second tube, wherein the shaft and the first tube are within the second tube and the shaft is within the first tube, wherein the shaft, the first tube and the second tube rotate independently of one another;
    engaging a first cam follower member of a cam follower with a first cam lobe and a second cam follower member with a second cam lobe, wherein the first cam lobe is coupled to the shaft with a first pin assembly that passes through the shaft and through cutouts in the first and second tubes, and the second cam lobe is coupled to the first tube with a second pin assembly passing through apertures in the second tube; and
    coupling one end of a rocker arm to the cam follower.

7. The method of claim 6, which further includes assembling the cam follower by rotatingly mounting the first cam follower member to the cam follower.

8. The method of claim 7, wherein assembling the cam follower includes contacting a surface of the first cam follower member with a bearing.

9. The method of claim 7, wherein the cam follower is spring loaded such that the first cam follower member disengages the first cam lobe over a portion of a revolution of the double nested camshaft.

10. The method of claim 7, further comprising attaching a spring between the rocker arm and the cam follower.

11. The method of claim 7, further comprising fastening a spring between the cam follower and a relatively fixed location of the internal combustion engine.

12. The method of claim 6, wherein the first pin assembly includes a pin within a sleeve.

13. An apparatus comprising:
- a rocker arm operable to be used in a variable valve actuation engine;
- a cam shaft having a variable first lobe and a variable second lobe, the cam shaft including a shaft, a first tube, and a second tube, wherein the shaft and first tube are within the second tube and the shaft is within the first tube, wherein the shaft, the first tube and the second tube rotate independently of one another, wherein the variable first lobe is coupled to the shaft with a first pin assembly that passes through the shaft and through cutouts in the first and second tubes, and the variable second lobe is coupled to the first tube with a second pin assembly passing through apertures in the second tube; and
- means for following the variable first lobe and the variable second lobe, the means coupled to an end of the rocker arm.

14. The apparatus of claim 13, wherein the first pin assembly includes a pin within a sleeve.

15. A method comprising:
- rotating a cam shaft having an independently variable first lobe and an independently variable second lobe, the cam shaft including a shaft, a first tube, and a second tube, wherein the shaft and first tube are within the second tube and the shaft is within the first tube, wherein the shaft, the first tube and the second tube rotate independently of one another, wherein the variable first lobe is coupled to the shaft with a first pin assembly that extends through the shaft and through cutouts in the first and second tubes, and the variable second lobe is coupled to the first tube with a second pin assembly passing through apertures in the second tube;
- engaging the variable first lobe with a first member of a cam follower;
- engaging the variable second lobe with a second member of the cam follower;
- pivoting the cam follower about a rocker; and
- rocking the rocker to actuate a valve.

16. The method of claim 15 includes biasing the cam follower with an energy device.

17. The method of claim 15, wherein the first pin assembly includes a pin within a sleeve.

* * * * *